(12) United States Patent
Akatsuka

(10) Patent No.: US 6,764,401 B1
(45) Date of Patent: Jul. 20, 2004

(54) GAME SYSTEM AND PROGRAM

(75) Inventor: Tetsuya Akatsuka, Yokohama (JP)

(73) Assignee: Namco, Ltd., Tokyo (JP)

( * ) Notice: Subject to any disclaimer, the term of this patent is extended or adjusted under 35 U.S.C. 154(b) by 83 days.

(21) Appl. No.: 09/806,307

(22) PCT Filed: Aug. 4, 2000

(86) PCT No.: PCT/JP00/05242

§ 371 (c)(1),
(2), (4) Date: Apr. 12, 2001

(30) Foreign Application Priority Data

Aug. 4, 1999 (JP) ............................................ 11-221621

(51) Int. Cl.⁷ ................................................ A63F 13/00

(52) U.S. Cl. ................................ 463/36; 463/43; 463/8

(58) Field of Search ............................. 463/1–8, 36–38; 345/156–163, 704, 709, 810, 866; 710/5, 8

(56) References Cited

U.S. PATENT DOCUMENTS

| | | | |
|---|---|---|---|
| 5,759,100 A | | 6/1998 | Nakanishi |
| 5,760,768 A | * | 6/1998 | Gram ........................ 345/747 |
| 6,488,586 B1 | * | 12/2002 | Kobayashi et al. ........... 463/43 |

FOREIGN PATENT DOCUMENTS

| | | |
|---|---|---|
| JP | 9-56927 | 3/1997 |
| JP | 9-239150 | 9/1997 |
| JP | 10-263208 | 10/1998 |
| JP | 2000-157731 | 6/2000 |
| JP | 2000-229174 | 8/2000 |

OTHER PUBLICATIONS

Tekken 3, Namco (Apr. 1998), pp. 1–27.*
Kamen Rider; Kanzen Kouryaku Guidebook (Japan); Kabushiki Kaisha Akusera, (Nov. 21, 1998); p. 28.
Pokemon Stadium Cup Taiou; Pokeman Stadium Trainers' Guide (Japan); Kabushiki Kaisha Asuki (Oct. 16, 1998) pp. 6–13.
Play Station Kanpeki Kanpeki Kouryaku Series 58; Street Fighter EX plus Hisshou Kouryakuhou (Japan) Kabushiki Kaisha Futabasha, Aug. 1, 1997) p. 6.
Super Famikon Kanpeki Kouryaku Series 38; Street Fighter II Turbo Hisshou Kouryakuhou (Japan) Kabushiki Kaisha Futabasha (Jun. 20, 1994); p. 255.

* cited by examiner

*Primary Examiner*—Mark Sager
*Assistant Examiner*—Steven Ashburn
(74) *Attorney, Agent, or Firm*—Oliff & Berridge, PLC

(57) ABSTRACT

An objective is to provide a game system and program which can simply and easily execute a game operation command having a complicated operation procedure. A command list (14) showing techniques each of which is executed normally by manipulating buttons of a game controller with a given operation procedure, is displayed to a player. When a player selects a technique and presses a button B, a key record of that technique is assigned to a game button L. By pressing the button L, the technique of the assigned key record can be performed by a game character (20). The assignment information of key-record is stored in a memory card, enabling the assignment to be effective when the game system is powered on next time. By reading data of a command list externally through an information storage medium or communication line, a secret technique can be obtained. During a game, a command list (14) is displayed and a key record can be assigned to the button L. A handicap can be set by allowing or forbidding the player to assign a key record.

19 Claims, 17 Drawing Sheets

GAME SYSTEM AND PROGRAM

TECHNICAL FIELD

The present invention relates to a game system and program.

BACKGROUND ART

There is known a fighting game in which a player enjoys the game by operating its own character on a screen and causing it to fight against an enemy character operated by another player or computer. Such a fighting game is highly popular since the player can experience the virtual fighting as if it is an actual fighting in the real world.

In such a fighting game, the player manipulates buttons, crisscross keys (direction keys) and levers (which are operating keys, in a broad sense) on a game controller (an operating means, in a broad sense) according to a given procedure of operation to cause its own character to do techniques (or actions) corresponding to the given procedure of operation.

It is, however, generally difficult that a beginner fully masters such a procedure of operation. This may raise a problem in that the beginner will keep the fighting game at a distance.

On the other hand, medium and superior players can relatively easily perform the techniques alone. For example, in a combo technique (waza, attack) consisting of plural techniques, any medium or superior player may easily perform only one of these techniques, but it may be difficult that the player performs each technique upon performing the combo technique.

One of some possible techniques for overcoming such a problem is a so-called key record technique in which a procedure of operation inputted by a player using the buttons and/or crisscross keys (operating key) is stored in a memory, the stored contents being then replayed through a simplified operation.

However, the key record technique raises another problem in that the player must successfully accomplish such a procedure of operation at least once. Therefore, if it is very difficult or impossible that the player inputs the procedure of operation including various desired techniques, the key record will eventually be unable of being inputted by the player.

DISCLOSURE OF THE INVENTION

The present invention is devised in the light of the above problems and has as an objective thereof the provision of a game system and program which can execute game operation commands having a complicated procedure of operation, in a simple and easy manner.

In order to solve the above problems, the present invention provides a game system for generating game images, comprising: display means which displays a list of game operation commands to a player, each game operation command being executed by manipulating one or more operating keys of operation means with a given operation procedure; means which assigns a game operation command selected by a player from among the list of game operation commands to a given operating key of the operating means so that the selected game operation command can be selected by the player's simple manipulation; and means which executes the selected game operation command when the player manipulates the operating key to which the selected game operation command has been assigned. The present invention also provides a computer-usable information storage medium comprising a program for executing (or implementing) the above-described means. The present invention further provides a computer-usable program embodied on an information storage medium or in a carrier wave, comprising a processing routine for executing (or implementing) the above-described means.

According to the present invention, the player can simply and easily execute any complicated game operation command selected from the list of game operation commands merely by manipulating a given operating key. Thus, the load on the player can be relieved. Furthermore, the game operation commands can easily be linked.

Additionally, the player can assign any desired game operation command to an operating keys merely by selecting the desired game operation command from the list of game operation commands without actual input of the operation procedure for the game operation command. Thus, even a game operation command having an operation procedure which is very difficult or physically impossible to be inputted can be assigned to an operating key and simply and easily be executed by the player.

In the game system, information storage medium or program according to the present invention, the list of game operation commands may be a list of techniques or actions in a fighting game; and a key record of a technique or action selected by the player from among the list, of techniques or actions may be assigned to the operating key so that a game character can perform the selected technique or action in accordance with the key record when the player manipulates the operating key. Thus, the load on a player in the fighting game can remarkably be relived, and this can prevent a player who is inferior in the operating technique (waza, attack) from avoiding a fighting game.

In the game system, information storage medium or program according to the present invention, information of assignment of the game operation command to the operating key may be stored in an information storage medium for save. This makes it possible to keep the assigned contents effective after the power has been turned off and turned on again.

In the game system, information storage medium or program according to the present invention, the list of game operation commands may be displayed to the player based on data of the list of game operation commands read out externally through an information storage medium or a communication line. This makes it possible to disclose secret game operation commands to the player afterward. Therefore, the player can enjoy the game for a prolonged time period.

In the game system, information storage medium or program according to the present invention, the list of game operation commands may be displayed during a game according to the player's selection; the K-th game operation command may be executed during a game when the player manipulates an operating key to which the K-th game operation command has been assigned by the player's selection; and the L-th game operation command may be executed during a game when the player manipulates an operating key to which the L-th game operation command has been assigned by the player's selection. This makes it possible to change the assignment of game operation commands to the operating keys depending on the progress of the game, providing a more interesting game.

The game system, information storage medium or program according to the present invention may further comprise handicap setting means (or a program for implementing the handicap setting means, or a processing routine for implementing the handicap setting means) which allows the N-th player among a plurality of players to assign a selected game operation command to an operating key, but forbids the M-th player among a plurality of players to assign a selected game operation command to an operating key, when a plurality of players play a game.

According to the present invention, an inexperienced player or a beginner, for example, may be allowed to assign a game operation command to an operating key. On the other hand, an experienced or superior player may be forbidden to do the assignment. This enables a fair game between players, and an exciting fighting game can be expected.

BRIEF DESCRIPTION OF THE DRAWINGS

FIG. 15 is a flowchart illustrating the processing details of the embodiment of the present invention after the power has been turned on.

BEST MODE FOR CARRYING OUT THE INVENTION

Several embodiments of the present invention will now be described in connection with the drawings. Although the present invention will be described as to a fighting game, it is not limited to such a fighting game, but may be applied to any of various other games.

1. Arrangement

Figure 1:
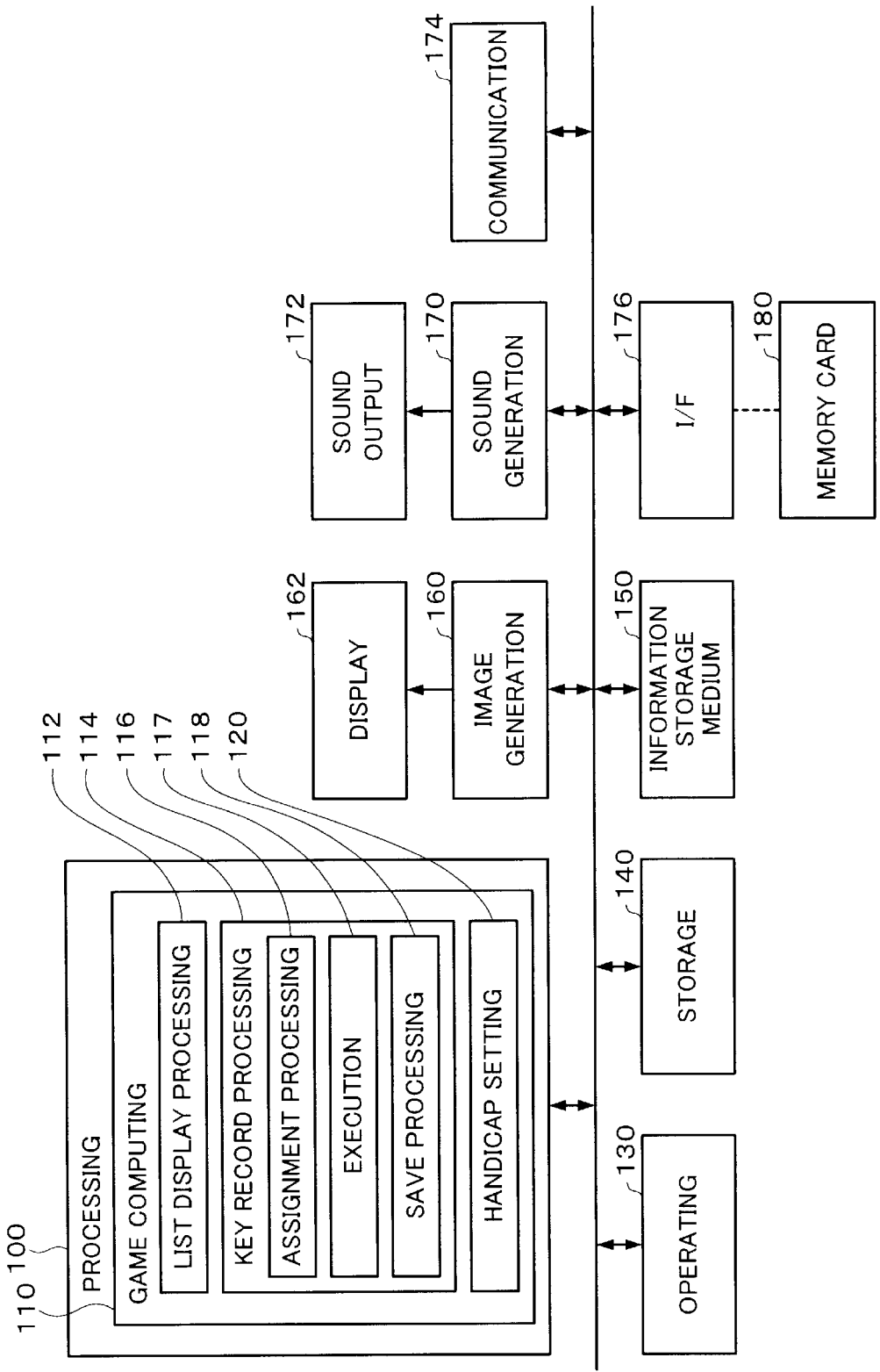
FIG. 1 is a block diagram of a game system according to the embodiment of the present invention.

FIG. 1 is a block diagram of one embodiment of the present invention. In this figure, the embodiment may include at least a processing section 100 (or a storage section 140 in addition to the processing section 100 or an information storage medium 150 in addition to the processing and storage sections 100, 140). The other blocks (e.g., operating section 130, image generation section 160, display section 162, sound generation section 170, sound output section 172, communication section 174, I/F section 176, memory card 180 and so on) may be optional.

The processing section 100 is designed to perform various processings for control of the entire system, commands to the respective blocks in the system, game computation and so on. The function thereof may be realized through any suitable hardware means such as CPU (CISC type, RISC type), DSP or ASIC (or gate array or the like) or a given program (or game program).

The operating section 130 is used to input operational data from the player and the function thereof may be realized through any suitable hardware means such as buttons, crisscross keys, levers, housing and so on.

The storage section 140 provides a working area for the processing section 100, image generation section 160, sound generation section 170, communication section 174, I/F section 176 and others. The function thereof may be realized by any suitable hardware means such as RAM or the like.

The information storage medium (which may be a computer-readable storage medium) 150 is designed to store information including programs, data and others. The function thereof may be realized through any suitable hardware means such as optical memory disk (CD or DVD), magneto-optical disk (MO), magnetic disk, hard disk, magnetic tape, semiconductor memory (ROM) or the like. The processing section 100 performs various processings in the present invention (or this embodiment) based on the information that has been stored in this information storage medium 150. In other words, the information storage medium 150 stores various pieces of information (or programs and data) for implementing (or executing) the means of the present invention (or this embodiment) which is particularly represented by the block included in the processing section 100.

Part or the whole of the information stored in the information storage medium 150 will be transferred to the storage section 140 when the system is initially powered on. The information stored in the information storage medium 150 may contain at least one of program code set for processing the present invention, image information, sound information, shape information of objects to be displayed, table data, list data, player information, command information for the processings in the present invention, information for performing the processings according to the commands and so on.

The image generation section 160 is designed to generate and output various images toward the display section 162 according to instructions from the processing section 100. The function thereof may be realized through any suitable hardware means such as image generation ASIC, CPU or DSP or according to a given program (or image generation program) or based on image information.

The sound generation section 170 is designed to generate and output various sounds toward the sound output section 172 according to instructions from the processing section 100. The function thereof may be realized through any suitable hardware means such as sound generation ASIC, CPU or DSP or according to a given program (or sound generation program) or based on sound information (waveform data and the like).

The communication section 174 is designed to perform various controls for communication between the game system and any external device (e.g., host machine or other image generation system). The function thereof may be realized through any suitable hardware means such as communication ASIS or CPU or according to a given program (or communication program).

Information for implementing the processings in the present invention (or this embodiment) may be delivered from an information storage medium included in a host machine (or server) to the information storage medium 150 through a network and the communication section 174. The use of such an information storage medium in the hose device (or server) falls within the scope of the invention.

Part or the whole of the function in the processing section 100 may be realized through the function of the image generation section 160, sound generation section 170 or communication section 174. Alternatively, part or the whole of the function in the image generation section 160, sound generation section 170 or communication section 174 may be realized through the function of the processing section 100.

The I/F section 176 serves as an interface for information interchange between the game system and a memory card (or a portable information storage device including a portable game machine in a broad sense) 180 according to instructions from the processing section 100. The function thereof may be realized through a slot into which the memory card is inserted, a data write/read controller IC or the like. If the information interchange between the game system and the memory card 180 is to be realized in a wireless manner (e.g., through infra-red communication), the function of the I/F section 176 may be realized through any suitable hardware means such as semiconductor laser, infra-red sensor or the like.

The processing section 100 further comprises a game computing section 110.

The game computing section 110 is designed to perform a game computation through which the player plays the game, based on the game operation of the player using the operating section 130. More specifically, the game computing section 110 performs various processes such as coin (or charge) reception, setting of various modes, game proceeding, setting of scene selection, determination of the position and rotation angle (about X-, Y- or Z-axis) of an object, determination of the view point and visual line (direction), regeneration (or generation) of the motion, arrangement of the object within the object space, hit checking, computation of the game results (or scores), processing for causing a plurality of players to play in a common game space, various game computations including game-over and other processes, based on operational data from the operating section 130 and according to the data and game program from the memory card 180.

The game computing section 110 includes a list display processing section 112, a key record processing section 114 and a handicap setting section 120.

The list display processing section 112 is to display a list of commands (or a list of game operation commands) relating to the techniques and actions of the character executed by manipulating the buttons and crisscross key (operating keys) on the operating section 130 according to a given procedure of operation to the player.

The key record processing section 114 is to perform various processings relating to the key record.

More specifically, the key record processing section 114 includes an assignment processing section 116 so designed that when any desired technique (or action) is selected by the player from the command list displayed, a key record (or game operation command) corresponding to that technique is assigned to a given button (in a broad sense, one or more operating keys which will be referred to "replay buttons") on the operating section 130.

The key record processing section 114 includes an execution section 117 so designed that when a replay button to which the key record has been assigned is manipulated by the player, the technique (waza, attack) of the assigned key record will be executed by the character. Thus, any complicated technique will be able of being executed by the player simply by pressing the replay button.

The key record processing section 114 also includes a save processing section 118 which stores the information of assignment of the key record to the replay button in the memory card 180 (in a broad sense, an information storage medium for save). Thus, even after the power has been turned off and when the power is again turned on, the key record set prior to the power-off will be assigned to the same replay button, based on the assignment information stored in the memory card 180. When the player presses the replay button, the key record assigned thereto will be replayed to execute the technique corresponding to that key record.

The handicap setting section 120 is so designed that when a plurality of players are to fight against one another, a handicap is set for each player. More specifically, if two players are to fight against each other, the assignment of key record to a replay button is permitted for one of the players while it is not permitted for the other player. Thus, the one player can get an advantage over the other player.

The game system of the present invention may be used in any of two play modes, a single-player mode in which a single player plays the game and a multi-player mode in which a plurality of players play the same game.

If a plurality of players are to play the game, game images and sounds provided to these players may be generated using a single terminal or plural terminals which are interconnected through a network (transmission or communication line).

2. Feature of this Embodiment

This embodiment is characterized by that a list of commands relating to techniques and actions is displayed to the player, that a key record corresponding to a technique (waza, attack, fighting technique) or action selected by the player is assigned to a given replay button and that that technique can be executed in a simplified manner or merely by pressing the same replay button.

Figure 2:
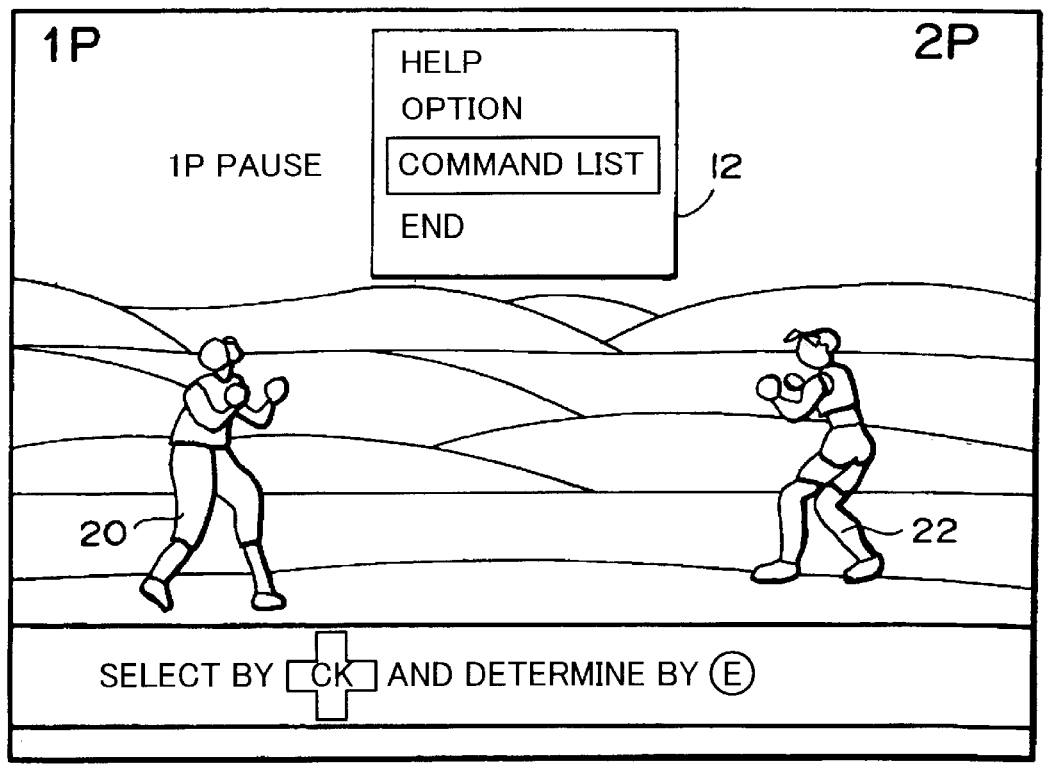
FIG. 2 is a view illustrating display of a pause menu.
Figure 2:
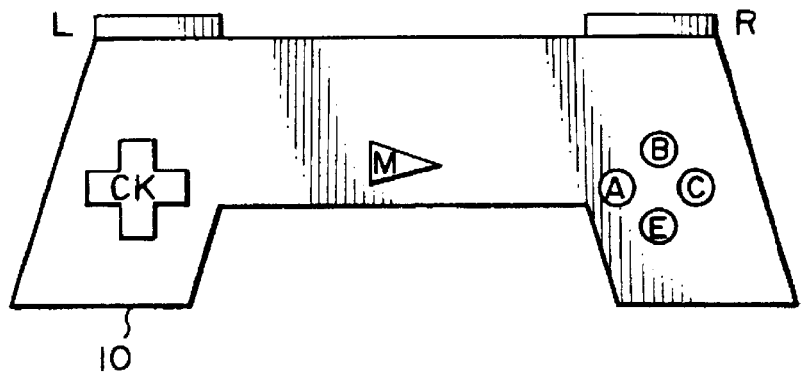

For example, in FIG. 2, a player on one side 1P is manipulating a character 20 to fight against another character 22 which is manipulated by another player on the other side 2P or by a computer. In such a case, if the player on the side 1P presses a button M (or menu button) on a game controller (or operating means) 10, a pause menu 12 may be displayed.

Figure 3:
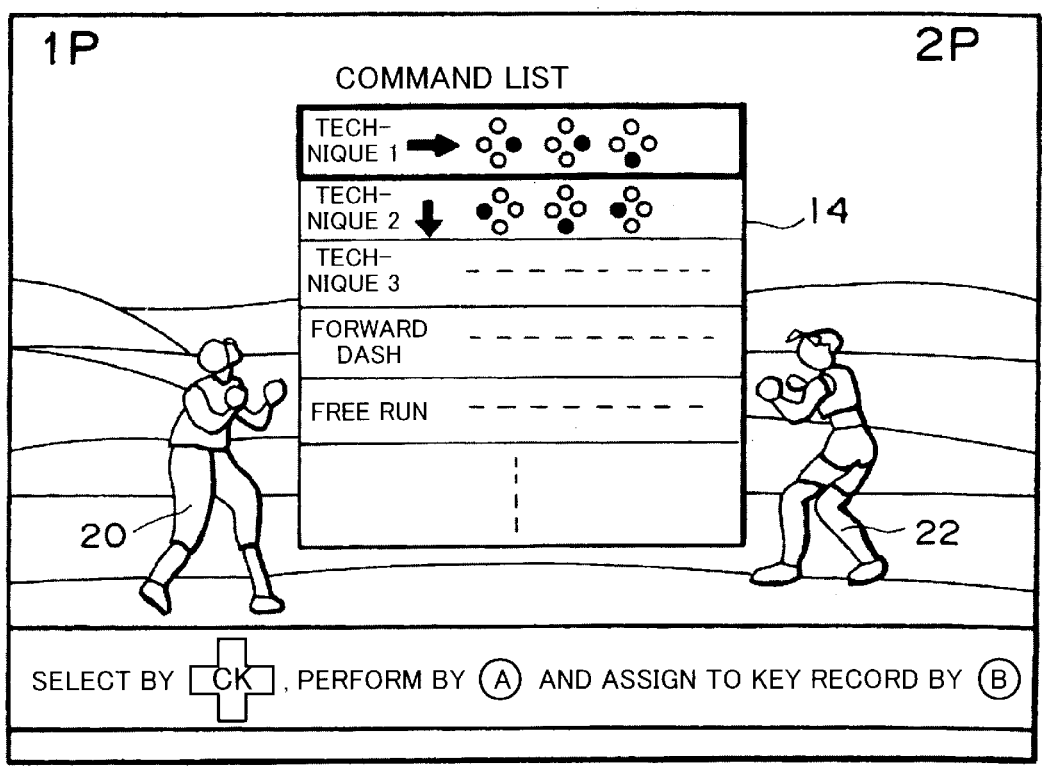
FIG. 3 is a view illustrating display of a command list.

If the player selects the item of command list in this pause menu 12 through a crisscross key CK and then presses a button E (or determination button), such a command list as shown in FIG. 3 is displayed. This command list 14 includes a list of techniques and actions which can be executed by the character 20.

Figure 4:
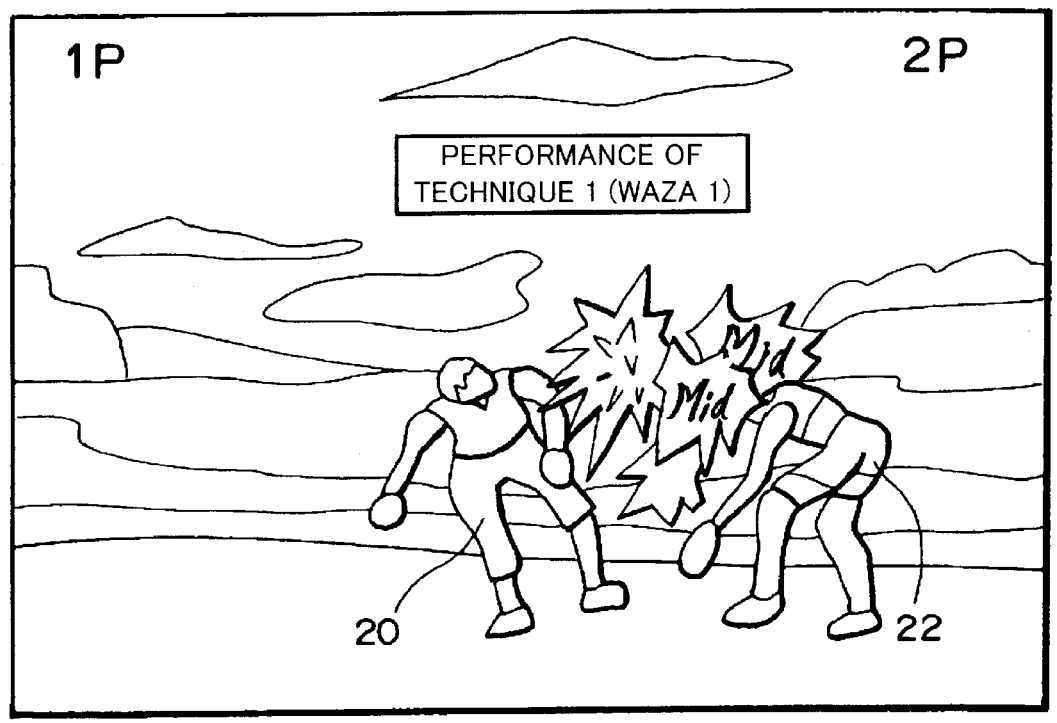
FIG. 4 is a view illustrating performance of a technique (waza, attack).
Figure 4:
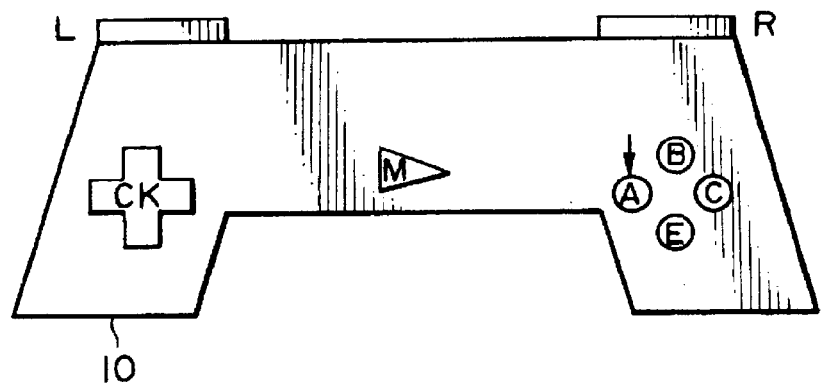

If the player selects one of the techniques (e.g., technique 1) in the command list 14 using the crisscross key CK and then presses a button A, the character 20 executes the technique 1 as shown in FIG. 4. Thus, the player can confirm how the technique 1 is executed.

Figure 5:
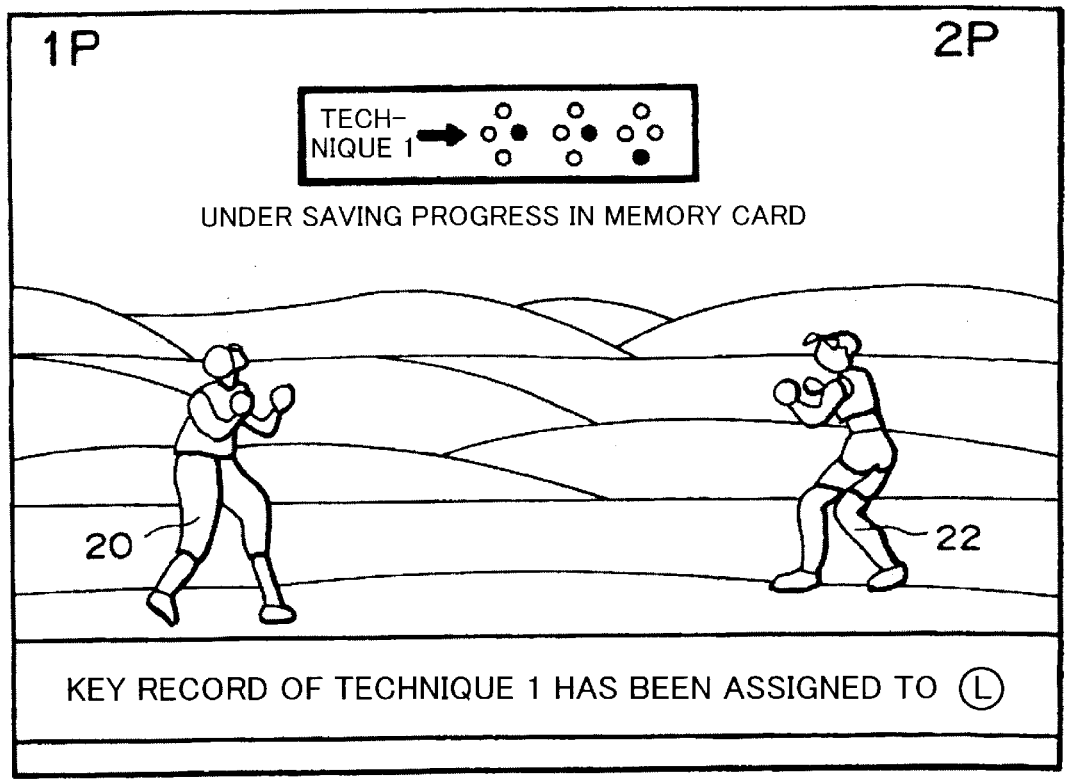
FIG. 5 is a view illustrating assignment of a key record to a button L.
Figure 5:
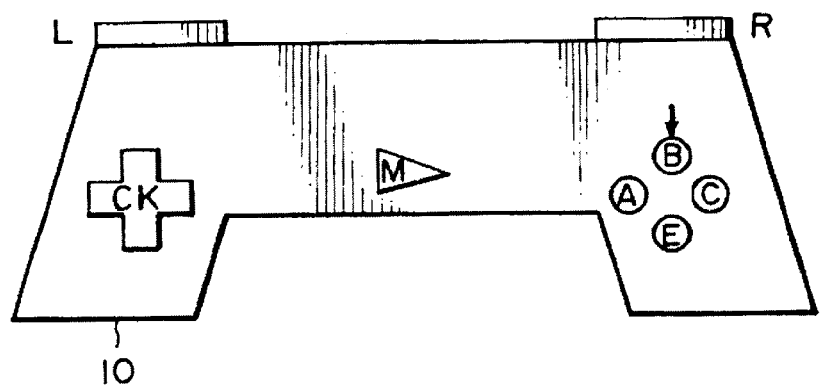

On the other hand, if the player selects the technique 1 in the command list 14 of FIG. 3 using the crisscross key CK and then presses a button B, the key record of the technique 1 is assigned to a button L (or replay button) as shown in FIG. 5. In other words, the key record representing a procedure of operation for executing the technique 1 by sequentially pressing the right side of the crisscross key CK, a button C, the same button C and a button E is assigned to the button L. The information of key-record assignment (or information representing which key record is assigned to the button L) is saved in the memory card.

Figure 6:
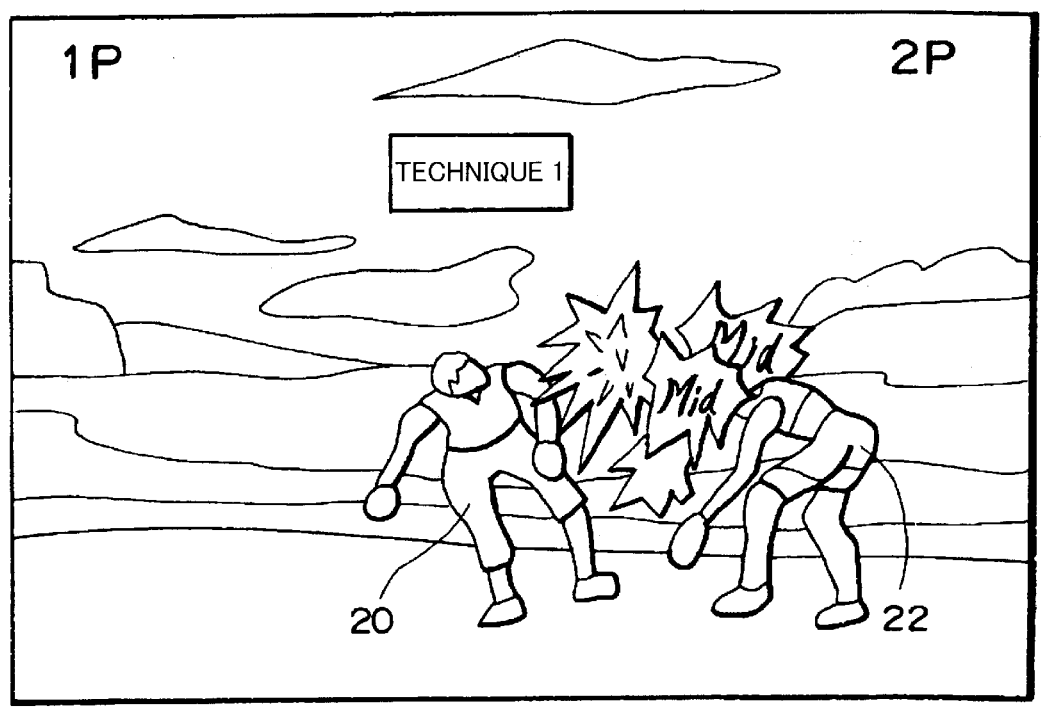
FIG. 6 is a view illustrating execution of a technique by simply pressing the button L.
Figure 6:
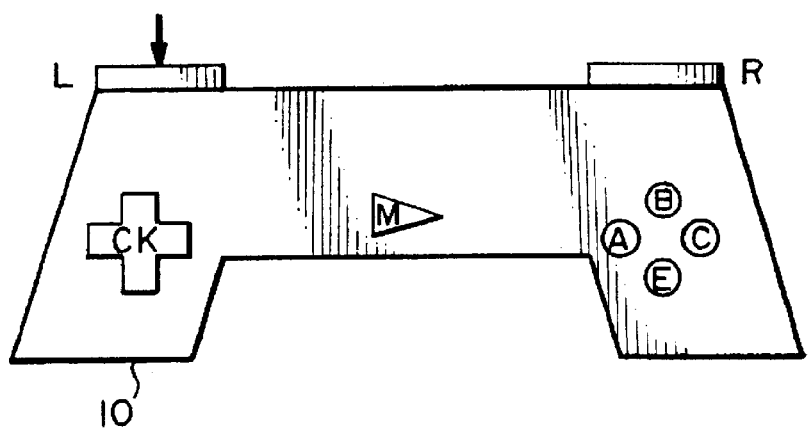

As the player presses the button L (or replay button) after the key-record assignment, the character 20 will execute the technique 1 based on the key record assigned to the button L, as shown in FIG. 6.

In order to execute the technique, the prior art requires a complicated procedure of operation in which the buttons C and E are sequentially pressed at a given timing after the right side of the crisscross key CK has been pressed, as shown in the command list 14 of FIG. 3. On the contrary, the present invention only requires to press the button L as shown in FIG. 5. Therefore, even the beginner who cannot easily execute the technique 1 due to the difficulty of operation procedure can easily execute the technique 1.

In a combo technique which executes the technique 1 after a certain technique and then performs another technique, it is very difficult that a medium or superior player which can execute the technique 1 alone executes the technique 1 upon trying such a combo technique. However, the present invention can cause the player to execute the combo technique in a simple and easy manner since only the button L may be pressed with respect to the technique 1.

According to the present invention, particularly, the key record of a desired technique is assigned to the button L only by selecting the desired technique from the command list. Therefore, the player can assign the key record of that technique to the button L without successfully executing the technique. Even the key record of a technique which cannot successfully be executed by the player through training can easily be assigned to the button L.

The assignment information of key record (game operation command) can be stored in a memory card (or information storage medium for save) as shown in FIG. 5. Thus, the key record assigned to the button L prior to power-off can be effective even when the game system is powered off and again on. The player can press the button L to execute the technique corresponding to the assigned key record.

The assignment information of key record may be stored only in a temporary storage means such as RAM or the like, rather than the memory card. In this case, however, there is a disadvantage in that if the game system has been powered off, the assignment of the key record to the button L will be ineffective.

The data in the command list is normally read and stored in the storage section of the game system through the information storage medium that is a medium for game software. However, the data in the command list may externally be read in the game system from an information storage medium 30 such as CD-ROM that is an appendix to a magazine, unlike the information storage medium for game software or through a communication line 32 such as internet or the like. The command list 14 may be displayed based on the read data. Thus, such a secret technique (special technique) as shown in the command list 14 of FIG. 7 may be supplied to the player using the information storage medium 30 or communication line 32 after the game software has been sold. If such a secret technique is disclosed timing when the player tires the game software, the player will be more interesting the game software for a prolonged time period.

Figure 7:
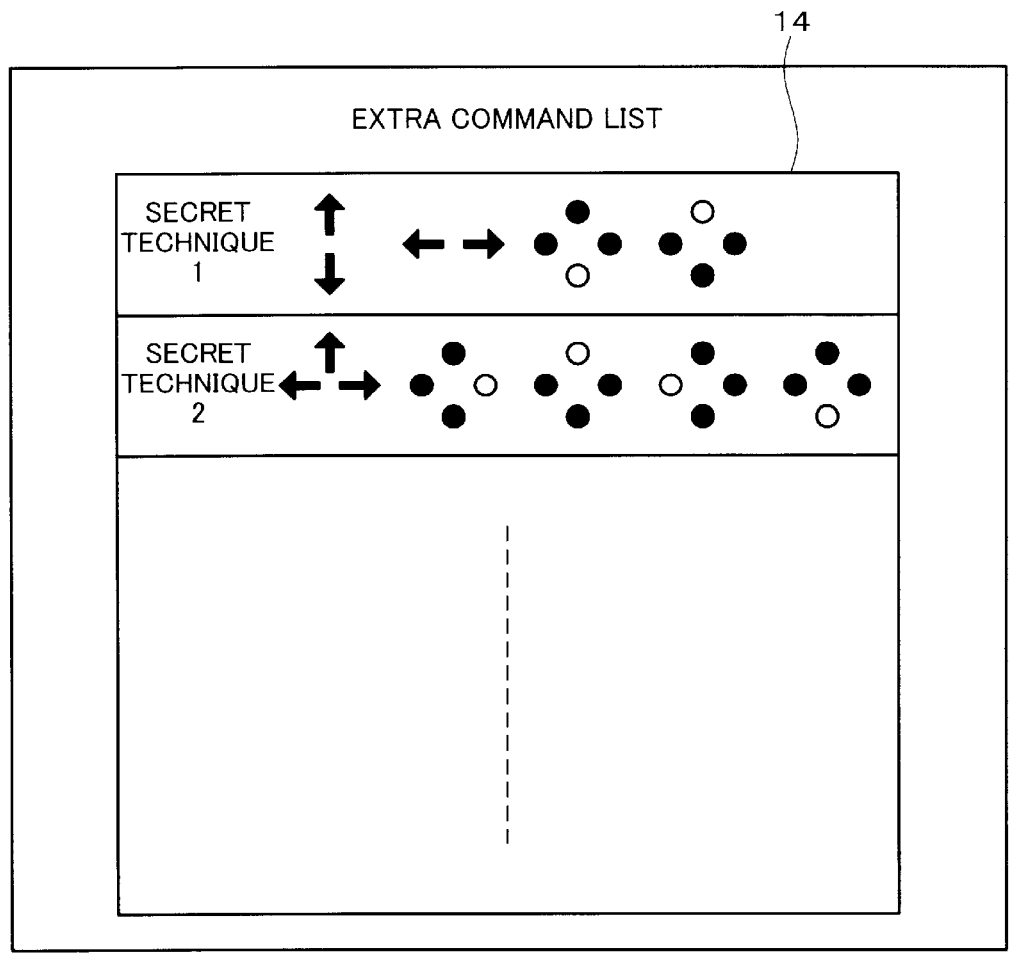
FIG. 7 is a view illustrating a technique of displaying the command list based on data externally read through an information storage medium or communication line.
Figure 7:
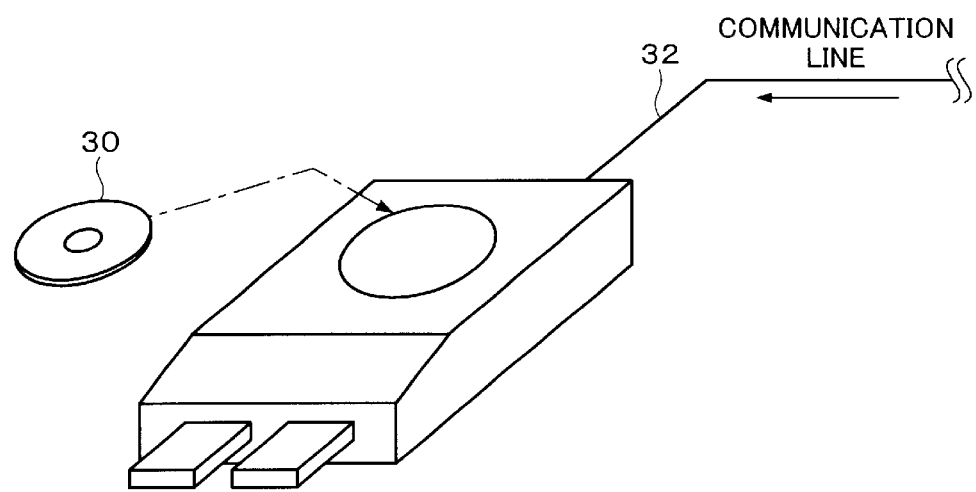

A technique (or game operation command) implemented by a operating procedure which could not physically be inputted by the normal game operation can be displayed in the command list 14, as shown in FIG. 7. For example, a secret technique 1 of FIG. 7 can be executed only by simultaneously pressing the upper and lower sides of the crisscross key CK. Such a game manipulation cannot physically be performed by the human hands.

However, such a game manipulation can be realized as the data of key record. Thus, the player can execute the secret technique 1 merely by selecting the secret technique 1 from the command list 14 and assigning the secret technique 1 to the button L, without performing the above game manipulation. This provides a new enjoyment of game to the player.

The command list can be displayed during the game by the player's selection. When the player selects a desired technique and assigns its key record to the button L, the player can immediately execute that technique using the button L during the same game play.

Figure 8A:
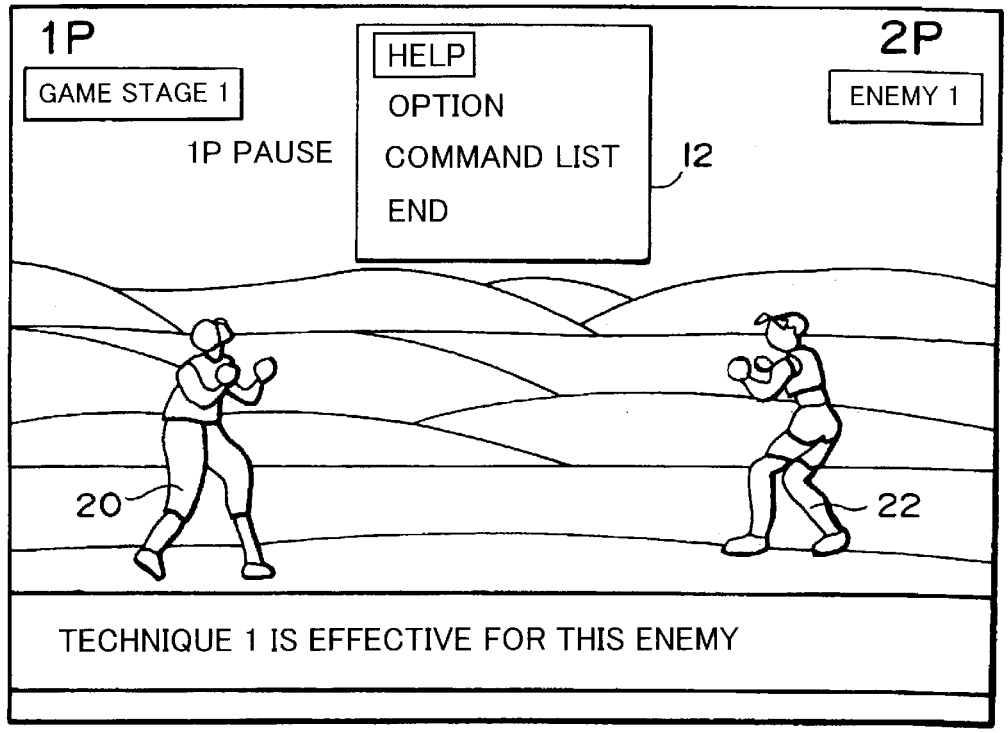
FIGS. 8A and 8B are views illustrating a technique of assigning a key record to the button L during a game play.
Figure 8B:
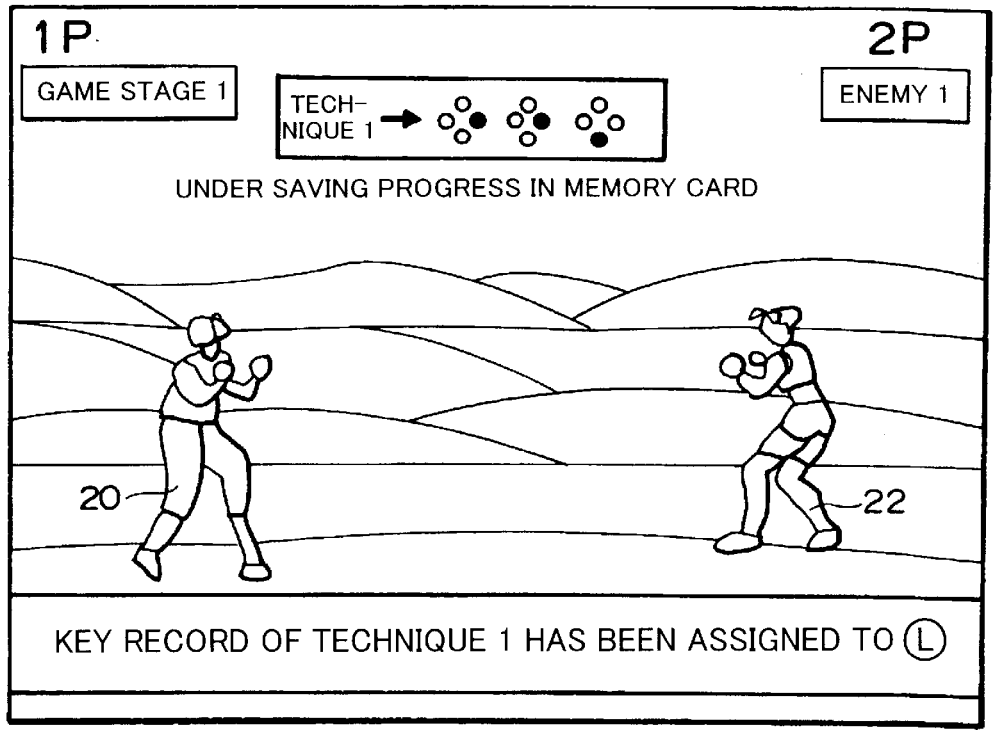
Figure 9:
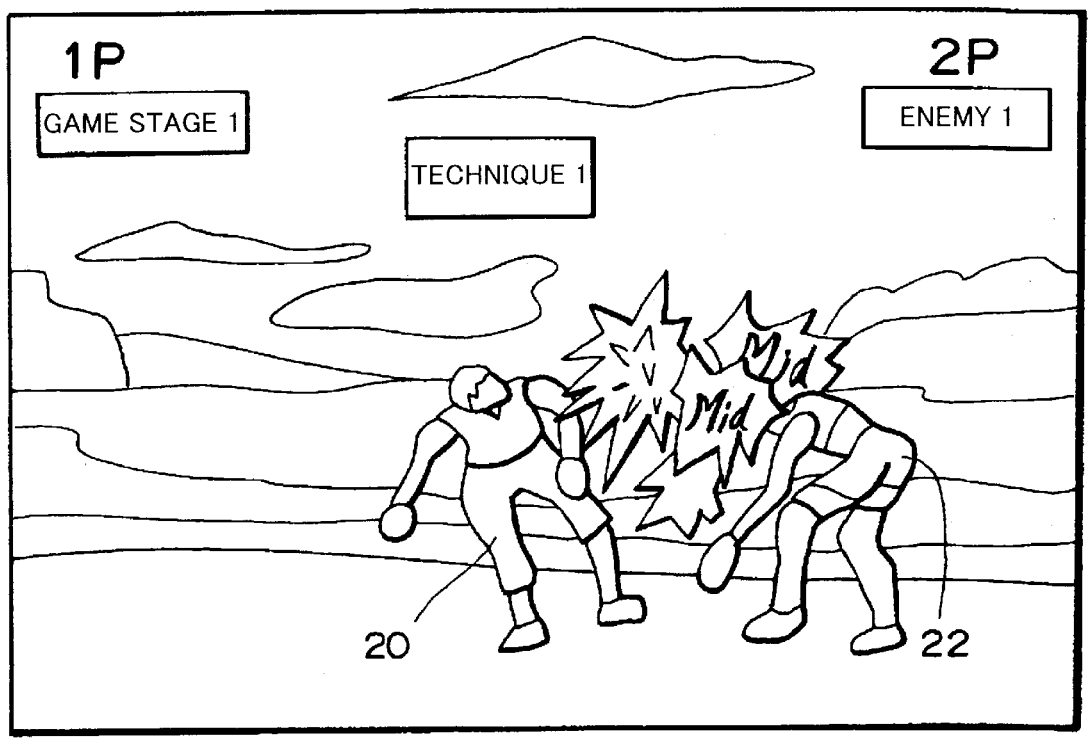
FIG. 9 is a view showing a game scene in which the technique of the key record assigned to the button L is executed during the game play.
Figure 9:
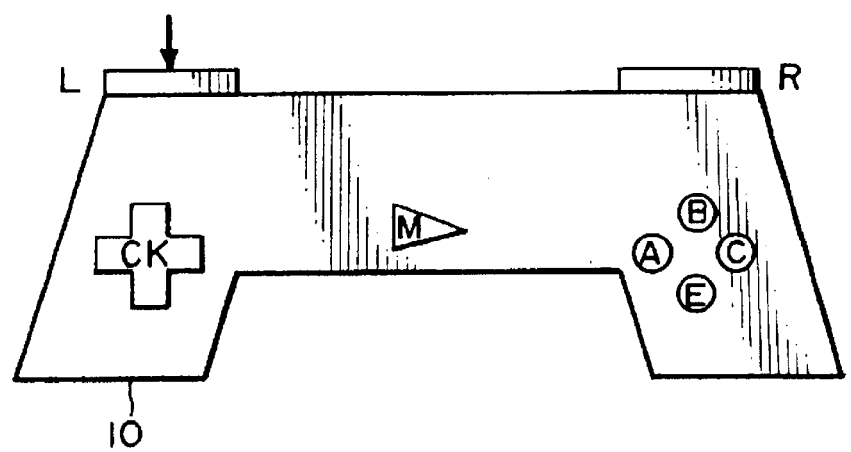

For example, in FIG. 8A, when a player on the side 1P selects the item of help from the pause menu 12, it maybe advised to the player that an effective technique against the character 22 (enemy 1) appearing on a game stage 1 (scene 1) is the technique 1. In such a case, the player selects the technique 1 from the command list and assigns the key record of the technique 1 to the button L, as shown in FIG. 8B. Thus, the player can execute the technique 1 effective to the enemy character 22 merely by pressing the button L, as shown in FIG. 9. As a result, the player can predominate in the game stage 1.

Figure 10A:
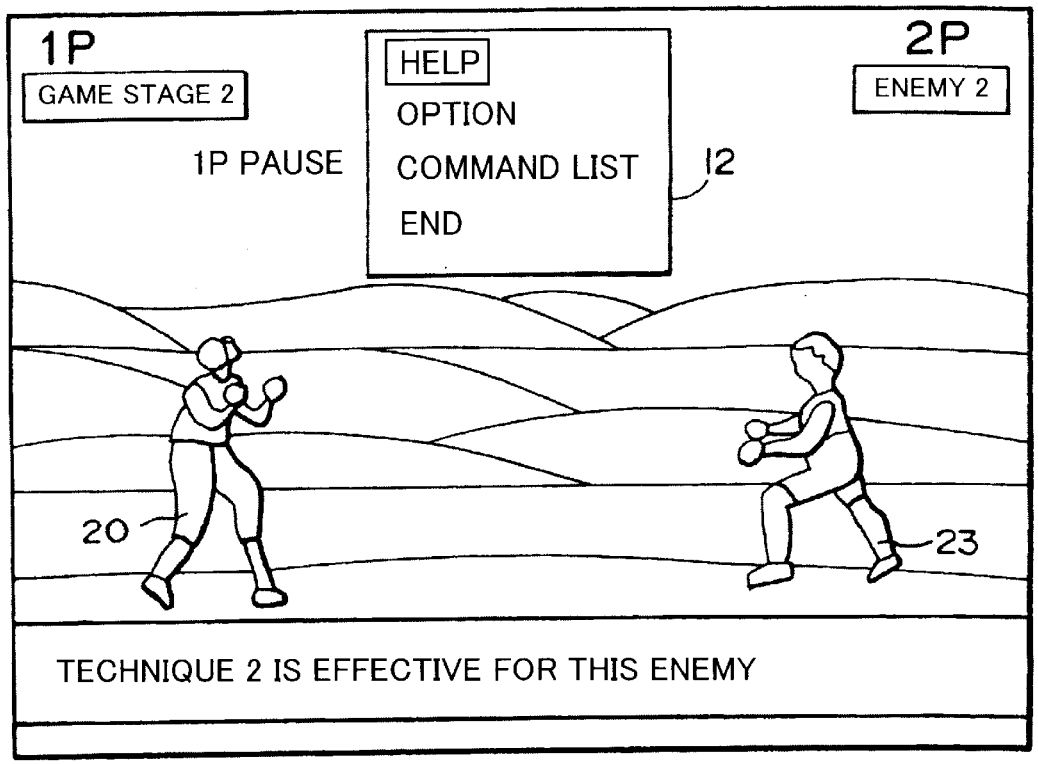
FIGS. 10A and 10B are also views illustrating a technique of assigning a key record to the button L during the game play.
Figure 10B:
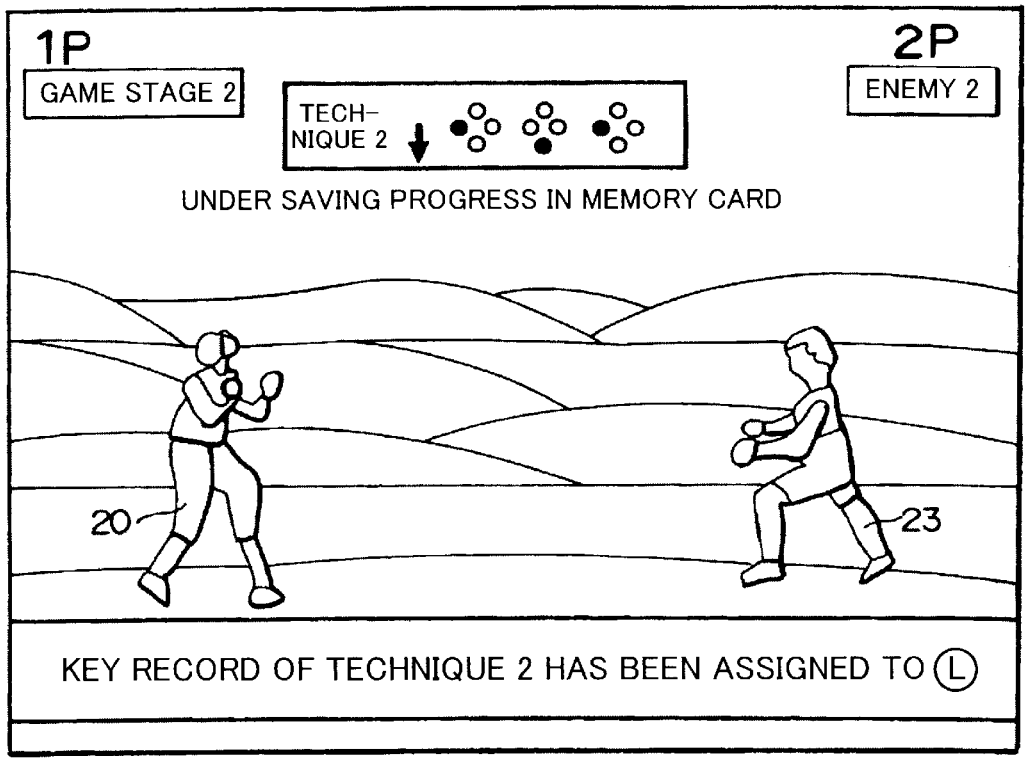
Figure 11:
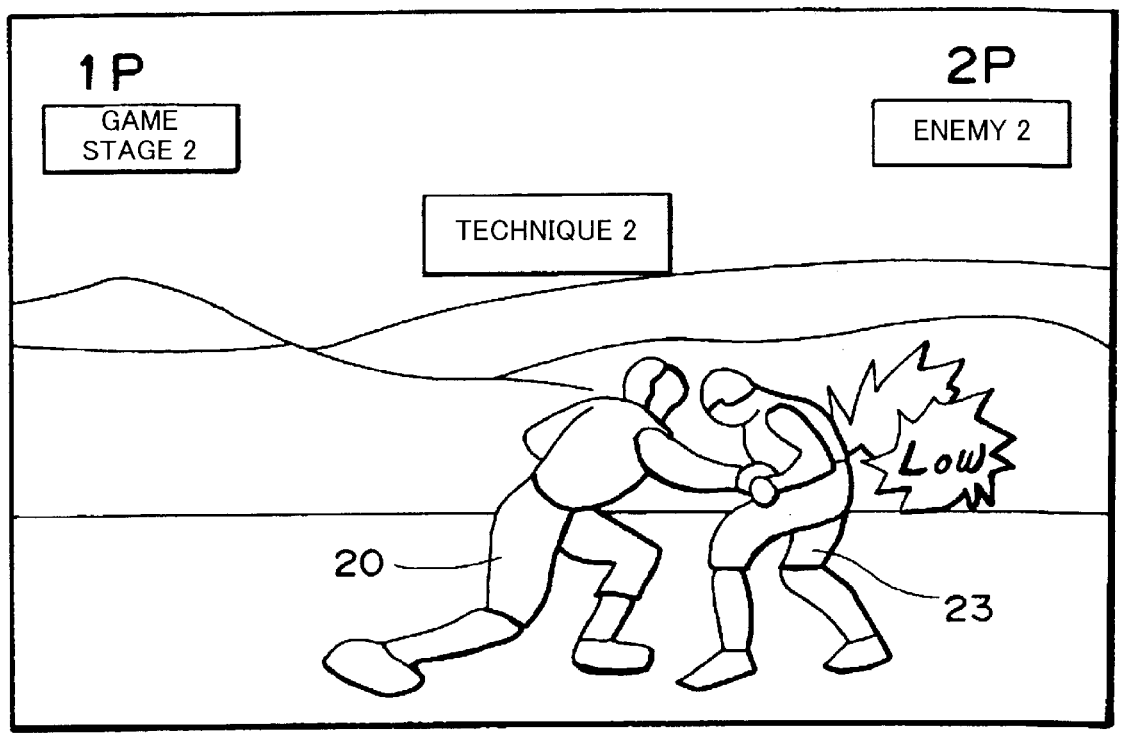
FIG. 11 is a view showing a game scene in which the technique of the key record assigned to the button L in a game is executed in that game.
Figure 11:
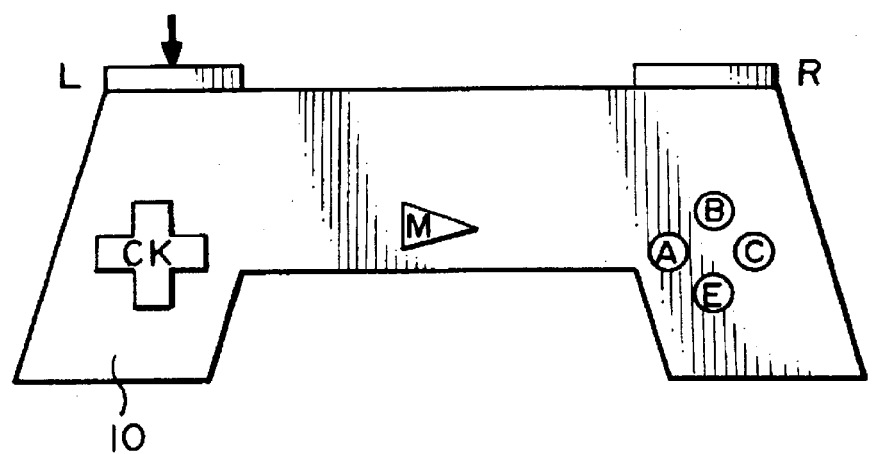

On the other hand, in FIG. 10A, it is advised to the player that a technique effective to a character 23 (enemy 2) appearing on a game stage 2 is a technique 2. In such a case, the player selects the technique 2 from the command list and assigns its key record to the button L, as shown in FIG. 10B. Thus, the player can execute the technique 2 effective to the enemy character 23 merely by pressing the button L, as shown in FIG. 11. As a result, the player can predominate in the game stage 2.

The display of command list and the assignment of key record to the button L maybe carried out in the other mode (e.g., training mode), rather than during the game play.

In this embodiment, a handicap may be set for each player by permitting or not-permitting the assignment of key record to the button L.

Figure 12:
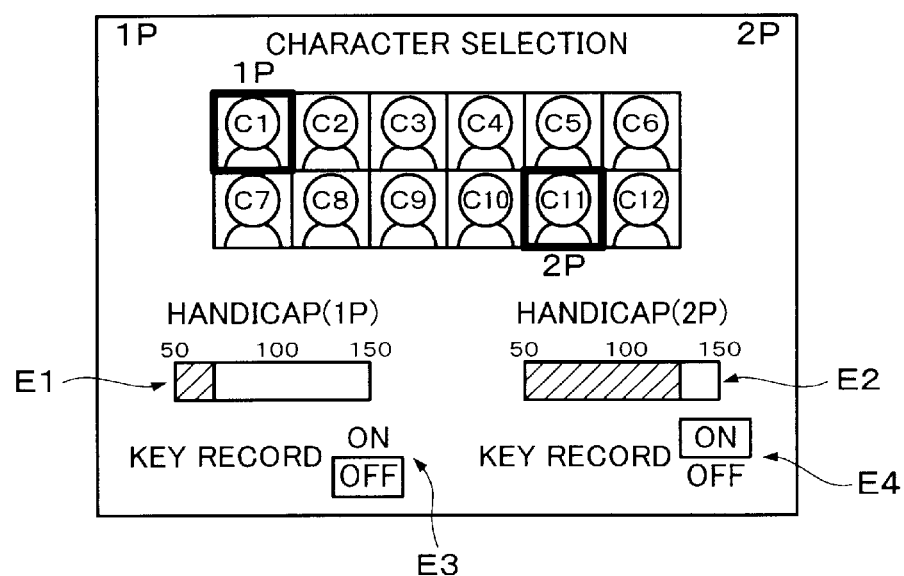
FIG. 12 is a view illustrating a technique of allowing or forbidding the assignment of a key record to set a handicap.

For example, in FIG. 12, a player on one side 1P may be an owner of the game software and familiar to the game. On the other hand, another player on the other side 2P may be a friend came to the house of the player on the side 1P and not familiar to the game operation. In order to make the game fair, a handicap may be set for each player. For example, a character C1 selected by the player on the side 1P may be weaker in ability as shown by E1 in FIG. 12 while another character selected by the player on the side 2P may be stronger in ability as shown by E2.

According to this embodiment, furthermore, the handicap can be set by permitting or not-permitting the assignment of key record to the button L. For example, at E3 in FIG. 12, the assignment of key record to the button L is not permitted for the player on the side 1P. On the other hand, at E4 in FIG. 12, the assignment of key record to the button L is permitted for the player on the side 2P. Therefore, the player on the side 2P can execute the specific technique merely by pressing the button L and evenly fight against the player on the side 1P who is the owner of the game software.

Although the key record of the technique is assigned to the button L in this embodiment, the key record of the technique may be assigned to any other operating key such as button R or the like. Alternatively, the key record of the technique may be assigned to the simultaneous operation of two buttons L and R. Key records of different techniques may be assigned separately to the respective buttons L and R.

3. Processing in this Embodiment

Figure 13:
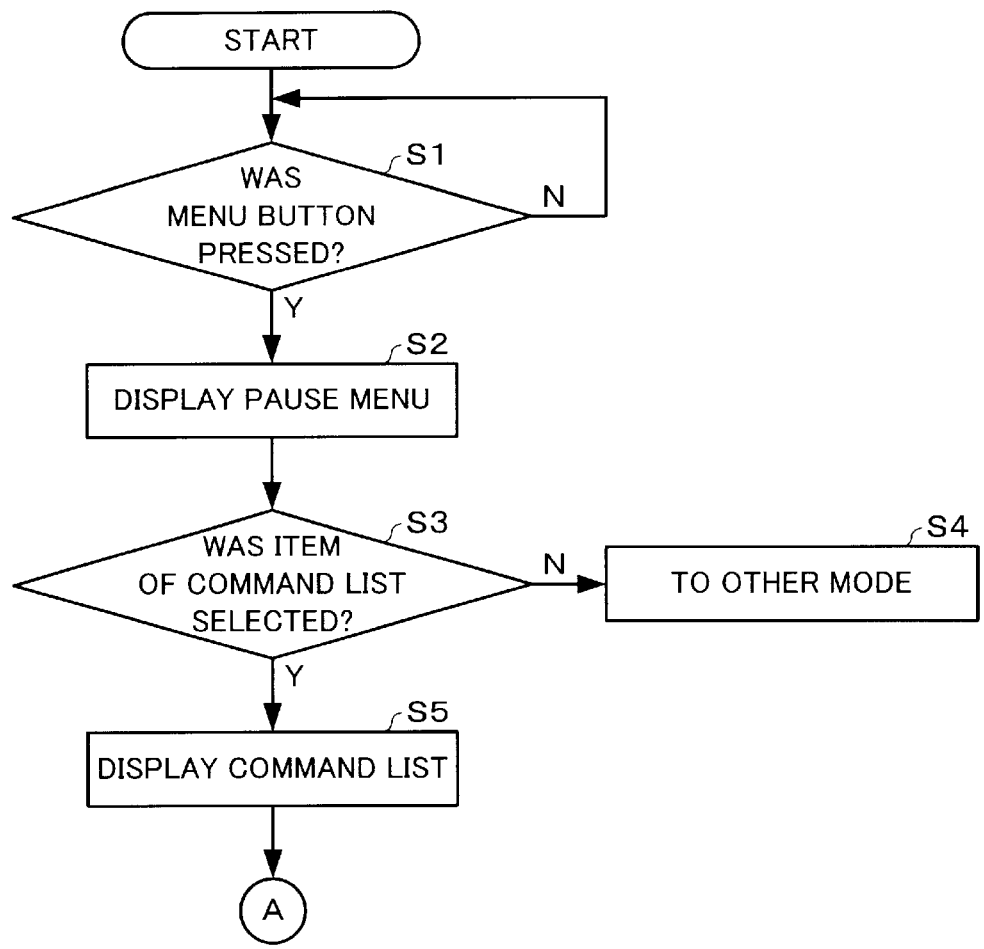
FIG. 13 is a flowchart illustrating the processing details of the embodiment of the present invention.
Figure 14:
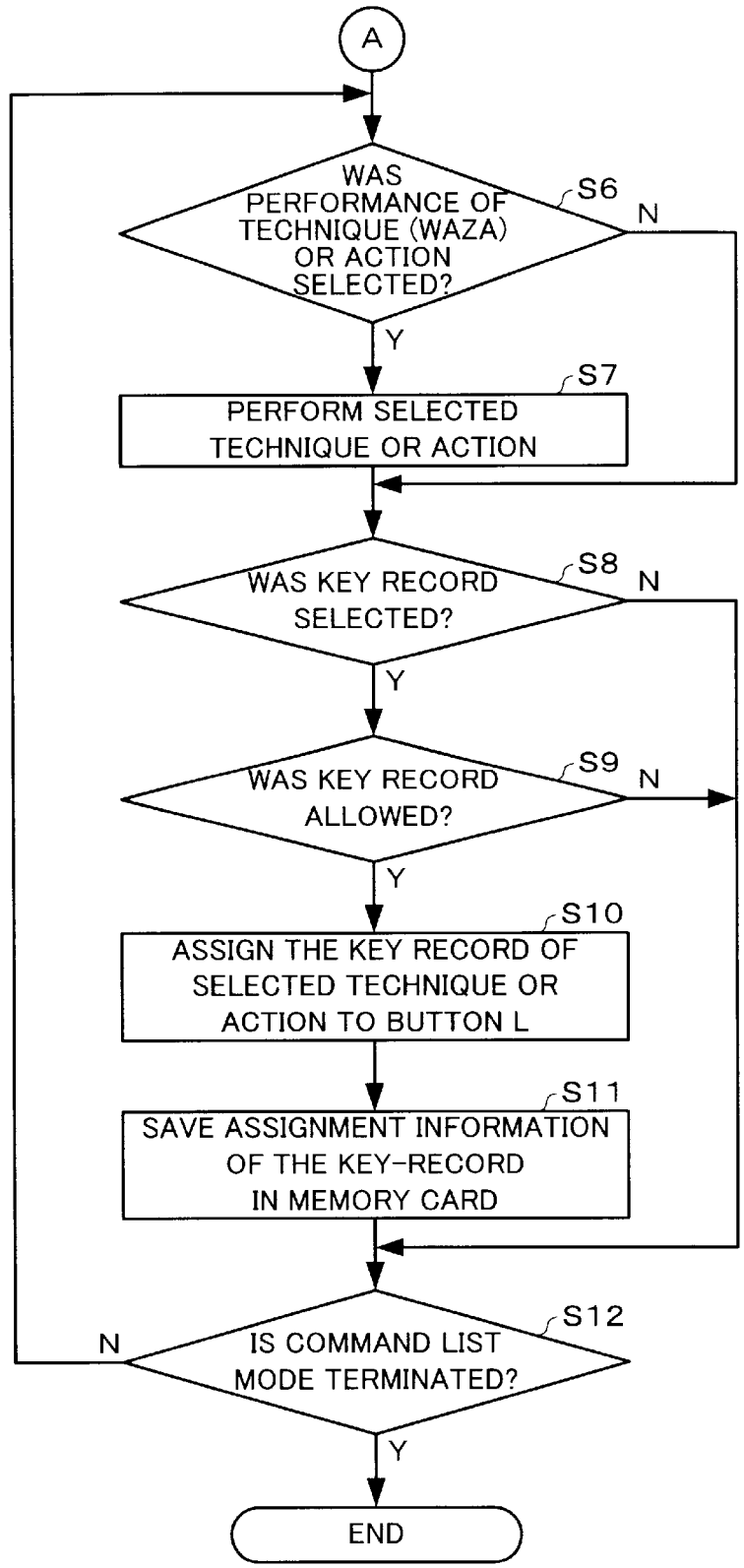
FIG. 14 is a flowchart illustrating the processing details of the embodiment of the present invention.

The details of a processing in this embodiment will be described in connection with the flowcharts of FIGS. 13, 14 and 15.

It is first judged whether or not the menu button is pressed (step S1). If so, the pause menu is displayed as shown in FIG. 2 (step S2).

It is then judged whether or not the player selects the item of command list (step S3). If any other item is selected, the procedure shifts to a mode corresponding the selected item (e.g., help mode, option mode or the like) (step S4). On the other hand, if the item of command list is selected, the command list is displayed as shown in FIG. 3 (step S5).

It is then judged whether or not the player selects the execution of technique or action (step S6). If so, the character is caused to execute the selected technique or action as shown in FIG. 4 (step S7).

It is then judged whether or not the player selects the key record (step S8). If so, it is judged whether or not the key record is permitted in the handicap setting screen as shown in FIG. 12 (step S9). If permitted, the key record of the technique or action selected by the player is assigned to the button L as shown in FIG. 5 (step S10) and at the same time the information of key-record assignment is saved in the memory card (step S11).

It is then judged whether or not the command-list mode is to be terminated (step S12). If it is not to be terminated, the procedure returns to the step S6. In this embodiment, the command-list mode can be terminated when the player presses a cancel button (or button C).

Figure 15:
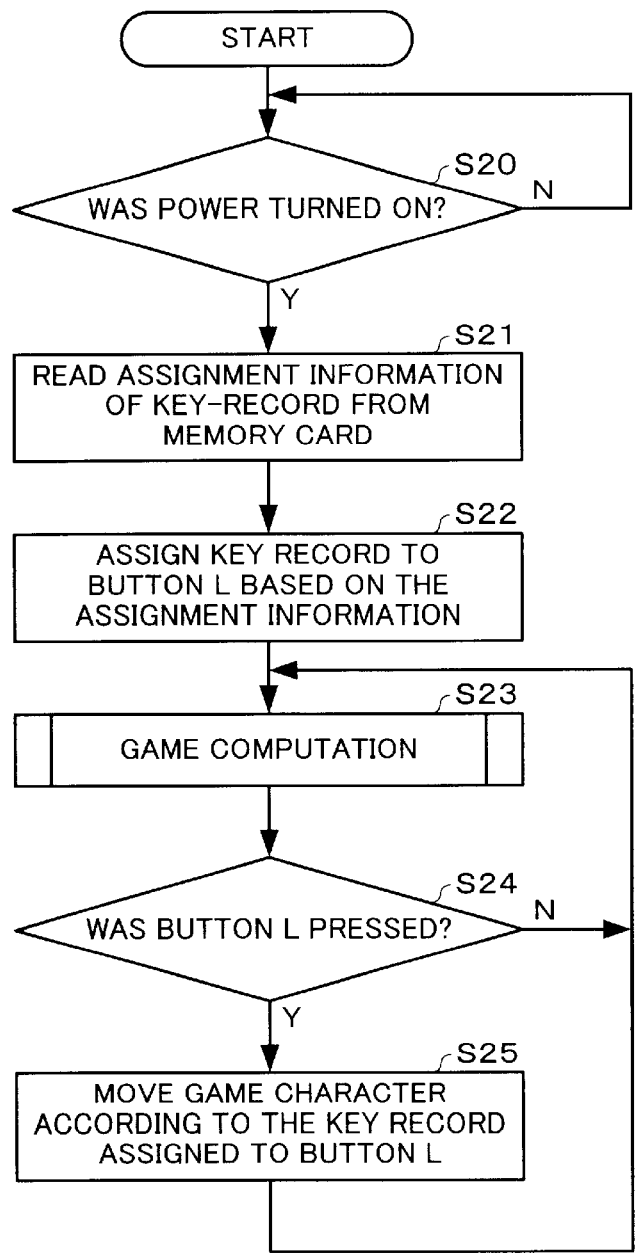

FIG. 15 is a flowchart illustrating the process after the game system has been powered on.

It is first judged whether or not the game system is powered on (step S20). If the game system is powered on, the information of key-record assignment is read out from the memory card (step S21). The information is one saved at the step S11 of FIG. 14.

The key record is then assigned to the button L based on the read assignment information (step S22). The procedure then shifts to a game computation (step S23).

In the game computation, it is judged whether or not the player presses the button L (step S24). If pressed, the character is moved based on the key record assigned to the button L (step S25).

4. Hardware Arrangement

Figure 16:
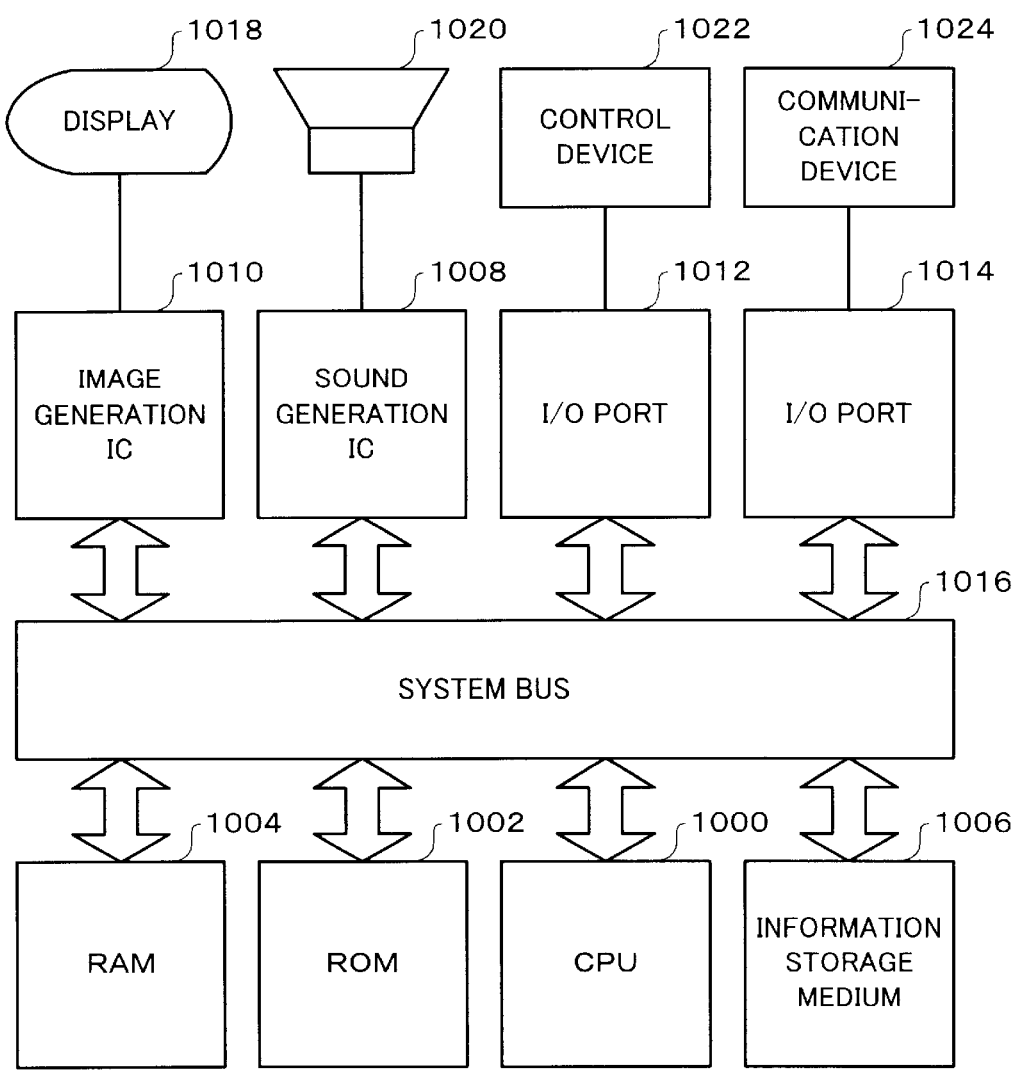
FIG. 16 is a view showing hardware configuration for implementing the embodiment of the present invention.

One hardware arrangement capable of implementing this embodiment will now be described with reference to FIG. 16. The system shown in FIG. 16 comprises CPU 1000, ROM 1002, RAM 1004, an information storage medium 1006, a sound generation IC 1008, an image generation IC 1010 and I/O ports 1012, 1014, all of which are interconnected through a system bus 1016 for data reception and transmission. The image generation IC 1010 is connected to a display 1018; the sound generation IC 1008 to a speaker 1020; the I/O port 1012 to a control device 1022; and the I/O port 1014 to a communication device 1024.

The information storage medium 1006 has mainly stored a program, image data for representing objects, sound data and others. For example, a home game apparatus may use a DVD, game cassette, CD-ROM or the like as an information storage medium for storing the game program and other data. An arcade game apparatus may use a memory such as ROM or the like. In the latter case, the information storage medium 1006 is in the form of ROM 1002.

The control device 1022 corresponds to a game controller, control panel or the like. The control device 1022 is used by the player for inputting his or her judgment into the game system according to the progress of game.

CPU 1000 is to perform the control of the entire game system and the processing of various data according to the program stored in the information storage medium 1006, the system program (such as information for initializing the entire system) stored in the ROM 1002, input signals from the control device 1022 and so on. RAM 1004 is a memory means used as a working area for the CPU 1000 and has stored given contents in the information storage medium 1006 and ROM 1002 or the results of computation in the CPU 1000. The structures of data having a logical structure for implementing this embodiment may be build on this RAM or information storage medium.

The sound and image generation IC's 1008, 1010 in this game system are to output game sounds and images. The sound generation IC 1008 is in the form of an integrated circuit for generating game sounds such as sound effects, background music and others, based on the information stored in the information storage medium 1006 and ROM 1002, the generated sounds being then outputted through the speaker 1020. The image generation IC 1010 is in the form of an integrated circuit which can generate pixel information to be outputted toward the display 1018 based on the image information from the RAM 1004, ROM 1002, information storage medium 1006 and so on. The display 1018 may be in the form of a so-called head mount display (HMD).

The communication device 1024 is to receive and transmit various pieces of information which are utilized in the game apparatus from and to external. The communication device 1024 is connected to the other game system (or systems) to transmit and receive given information corresponding to the game program from and to the other game systems or utilized to transmit and receive the information including the game program and other data through the communication line.

Various processing steps previously described in connection with FIGS. 1 to 15 are realized by the information storage medium 1006 stored the information such as program, data and so on, and CPU 1000, image generation IC 1010 and sound generation IC 1008 which operate based on the information from the information storage medium 1006. The processings in the image generation IC 1010 and sound generation IC 1008 may be performed in a software manner through the CPU 1000 or all-purpose DSP.

Figure 17A:
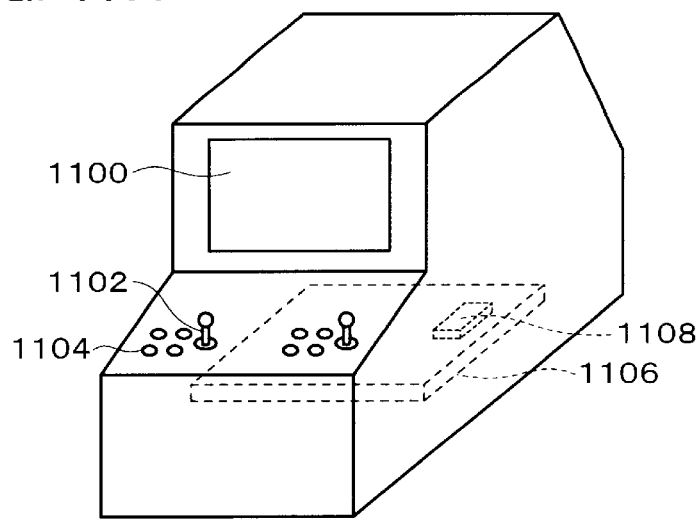
FIGS. 17A, 17B and 17C illustrate various forms of a system to which the embodiment of the present invention is applied.

FIG. 17A shows an arcade game system to which the present invention is applied. Players enjoy a game by manipulating levers 1102, buttons 1104 while viewing a game scene displayed on a display 1100. A system board (or circuit board) 1106 included in the game system comprises CPU, image generation IC, sound generation IC and others all of which are mounted therein. The system board 1106 includes an information storage medium or semiconductor memory 1108 which has stored information for executing (or implementing) the processings of this embodiment (or means of the present invention). These pieces of information will be referred to "the stored information pieces".

Figure 17B:
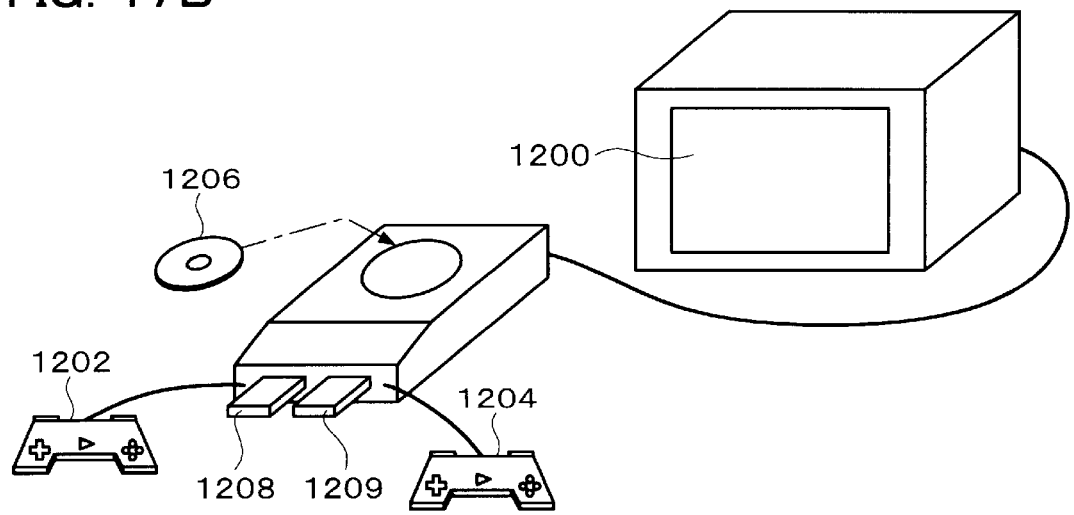

FIG. 17B shows a home game apparatus to which this embodiment is applied. A player enjoys a game by manipulating game controllers 1202 and 1204 while viewing a game picture displayed on a display 1200. In such a case, the aforementioned stored information pieces have been stored in DVD 1206 and memory cards 1208, 1209 which are detachable information storage media in the game system body.

Figure 17C:
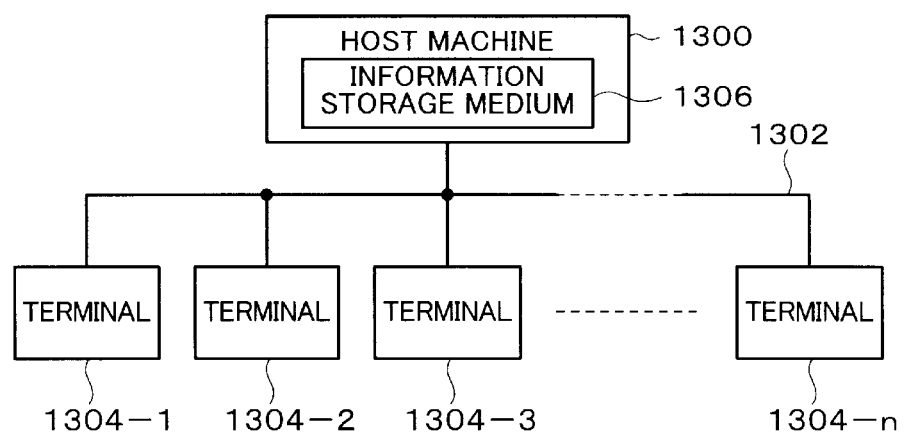

FIG. 17C shows an example wherein this embodiment is applied to a game system which includes a host machine 1300 and terminals 1304-1 to 1304-n connected to the host machine 1300 through a communication line (which is a small-scale network such as LAN or a global network such as INTERNET) 1302. In such a case, the above stored information pieces have been stored in an information storage medium 1306 such as magnetic disk device, magnetic tape device, semiconductor memory or the like which can be controlled by the host machine 1300, for example. If the terminals 1304-1 to 1304-n are designed each to have a CPU, image generation IC and sound processing IC and to generate game images and game sounds in a stand-alone manner, the host machine 1300 delivers game program and other data for generating game images and game sounds to the terminals 1304-1 to 1304-n. On the other hand, if the game images and sounds cannot be generated by the terminals in the stand-alone manner, the host machine 1300 will generate the game images and sounds which are in turn transmitted to the terminals 1304-1 to 1304-n.

In the arrangement of FIG. 17C, the processings of the present invention may be decentralized into the host machine (or server) and terminals. The above information pieces for implementing the present invention may be distributed and stored into the information storage media of the host machine (or server) and terminals.

Each of the terminals connected to the communication line maybe either of home or arcade type. When the arcade game systems are connected to the communication line, each of the arcade game systems may include a portable information storage device (memory card or portable game machine) which can transmit the information between the arcade game systems as well as between the arcade game systems and the home game systems.

The present invention is not limited to the things described in connection with the above forms, but may be carried out in any of various other forms.

For example, part of the dependent claims may be omitted. Alternatively, the primary part of one independent claim may be dependent on any other independent claim.

Although the list of game operation commands can be a list of techniques or actions in the fighting game, the present invention is not limited to such a list of game operation commands.

The present invention may be applied to any of various games such as sports games, robot combat games, music playing games, dancing games and so on, other than the fighting game.

Furthermore, the present invention can be applied to various game systems such as arcade game systems, home game systems, large-scaled multi-player attraction systems, simulators, multimedia terminals, image generation systems, game image generation system boards and so on.

What is claimed is:

1. A game system for generating game images, comprising:

display means which displays a list of game operation commands to a player while the player plays a game or a training mode, the game or training mode being a state of the game system in which the player manipulates the game character, the list of game operation commands being a list of techniques or actions of the game character which is manipulated by the player during the game or the training mode, and each game operation command being executed by manipulating one or more operating keys of operation means with a given operation procedure;

means which assigns a game operation command selected by the player from among the list of game operation commands to a given operating key of the operating means so that the selected game operation command can be executed by the player's simple manipulation, the game operation command being assigned to the given operating key without the player leaving that game or training mode and without the player manipulating said one or more operating keys with said given operation procedure; and means which executes the selected game operation command when the player manipulates the operating key to which the selected game operation command has been assigned.

2. The game system ad defined in claim 1, wherein the list of game operation commands is a list of techniques or actions in a fighting game; and wherein a key record of a technique or action selected by the player from among the list of techniques or actions is assigned to the operating key so that a game character can perform the selected technique or action in accordance with the key record when the player manipulates the operating key.

3. The game system as defined in claim 1, wherein information of assignment of the game operation command to the operating key is stored in an information storage medium for save.

4. The game system as defined in claim 1, wherein the list of game operation commands is displayed to the player based on data of the list of game operation commands read out externally through an information storage medium or a communication line.

5. The game system as defined in claim 1, wherein the list of game operation commands is displayed during a game according to the player's selection;

wherein a first game operation command is executed during a game when the player manipulates an operating key to which the first game operation command has been assigned by the player's selection; and wherein a second game operation command is executed during a game when the player manipulates an operating key to which the second game operation command has been assigned by the player's selection.

6. The game system as defined in claim 1, further comprising:

handicap setting means which allows a player among a plurality of players to assign a selected game operation command to an operating key, but forbids another player among the plurality of players to assign a selected game operation command to an operating key, when a plurality of players play a game.

7. A computer-readable program embodied on an information storage medium or in a carrier wave, comprising a processing routine for executing:

display means which displays a list of game operation commands to a player while the player plays a game or a training mode, the game or training mode being a state of the game system in which the player manipulates the game character, the list of game operation commands being a list of techniques or actions of the game character which is manipulated by the player during the game or training mode, and each game operation command being executed by manipulating one or more operating keys of operation means with a given operation procedure;

means which assigns a game operation command selected by the player from among the list of game operation commands to a given operating key of the operating means so that the selected game operation command can be executed by the player's simple manipulation, the game operation command being assigned to the given operating key without the player leaving that game or training mode and without the player manipulating said one or more operating keys with said given operation procedure; and means which executes the selected game operation command when the player manipulates the operating key to which the selected game operation command has been assigned.

8. The program as defined in claim 7,
wherein the list of game operation commands is a list of techniques or actions in a fighting game; and
wherein a key record of a techniques or action selected by the player from among the list of techniques or actions is assigned to the operating key so that a game character can perform the selected technique or action in accordance with the key record when the player manipulates the operating key.

9. The program as defined in claim 7,
wherein information of assignment of the game operation command to the operating key is stored in an information storage medium for save.

10. The program as defined in claim 7,
wherein the list of game operation commands is displayed to the player based on data of the list of game operation commands read out externally through an information storage medium or a communication line.

11. The program as defined in claim 7, wherein the list of game operation command sis displayed during a game according to the player's selection;
wherein a first game operation command is executed during a game when the player manipulates an operating key to which the first game operation command has been assigned by the player's selection; and
wherein a second game operation command is executed during a game when the player manipulates an operation key to which the second game operation command has been assigned by the player's selection.

12. The program as defined in claim 7, further comprising a processing routine for executing:
handicap setting means which allows a player among a plurality of players to assign a selected game operation command to an operating key, but forbids another player among the plurality of players to assign a selected game operation command to an operating key, when a plurality of players play a game.

13. A method for generating game images, comprising:
displaying a list of game operation commands to a player while the player plays a game or a training mode, the game or training mode being a state of the game system in which the player manipulates a game character, the list of game operation commands being a list of techniques or actions of the game character which is manipulated by the player during the game or the training mode, and each game operation command being executed by manipulating one or more operating keys of a game controller with a given operation procedure;

assigning a game operation command selected by the player from among the list of game operation commands to a given operating key of the game controller so that the selected game operation command can be executed by the player's simple manipulation, the game operation command being assigned to the given operating key without the player leaving that game or training mode and without the player manipulating said one or more operating keys with said given operation procedure; and executing the selected game operation command when the player manipulates the operating key to which the selected game operation command has been assigned.

14. The method as defined in claim 13, wherein the list of game operation commands is a list of techniques or actions in a fighting game; and
the method further comprising:
assigning a key record of a technique or action selected by the player from among the list of techniques or actions to the operating key so that a game character can perform the selected technique or action in accordance with the key record when the player manipulates the operating key.

15. The method as defined in claim 13, further comprising:
storing information of assignment of the game operation command to the operating key in an information storage medium for save.

16. The method as defined in claim 13, further comprising:
displaying the list of game operation commands to the player based on data of the list of game operation commands read out externally through an information storage medium or a communication line.

17. The method as defined in claim 13, further comprising:
displaying the list of game operation commands during a game according to the player's selection;
executing a first game operation command during a game when the player manipulates an operating key to which the first game operation command has been assigned by the player's selection; and
executing a second game operation command during a game when the player manipulates an operating key to which the second game operation command has been assigned by the player's selection.

18. The method as defined in claim 13, further comprising:
setting a handicap which allows a player among a plurality of players to assign a selected game operation command to an operating key, but forbids another player among the plurality of players to assign a selected game operation command to an operating key, when a plurality of players play a game.

19. A method for generating game images, comprising:
displaying a list of game operation commands to a player, each game operation command being executed by manipulating one or more operating keys of a game controller with a given operation procedure;
assigning a game operation command selected by a player from among the list of game operation commands to a given operating key of the game controller so that the selected game operation command can be executed by the player's simple manipulation;
executing the selected game operation command when the player manipulates the operating key to which the selected game operation command has been assigned; and setting a handicap which allows a player among a plurality of players to assign a selected game operation command to an operating key, but forbids another player among a plurality of players to assign a selected game operation command to an operating key, when a plurality of players play a game.

* * * * *